(12) United States Patent
Francis

(10) Patent No.: US 10,259,196 B2
(45) Date of Patent: Apr. 16, 2019

(54) LIGHTWEIGHT GYPSUM WALLBOARD

(75) Inventor: Hubert C. Francis, Lithonia, GA (US)

(73) Assignee: Georgia-Pacific Gypsum LLC, Atlanta, GA (US)

(*) Notice: Subject to any disclaimer, the term of this patent is extended or adjusted under 35 U.S.C. 154(b) by 1478 days.

(21) Appl. No.: 14/004,064

(22) PCT Filed: Mar. 5, 2012

(86) PCT No.: PCT/US2012/027725
§ 371 (c)(1),
(2), (4) Date: Jun. 10, 2014

(87) PCT Pub. No.: WO2012/122102
PCT Pub. Date: Sep. 13, 2012

(65) Prior Publication Data
US 2014/0315008 A1    Oct. 23, 2014

Related U.S. Application Data

(60) Provisional application No. 61/451,384, filed on Mar. 10, 2011.

(51) Int. Cl.
*B32B 13/08* (2006.01)
*B28B 19/00* (2006.01)
(Continued)

(52) U.S. Cl.
CPC .......... *B32B 13/08* (2013.01); *B28B 19/0092* (2013.01); *B32B 5/245* (2013.01); *B32B 37/15* (2013.01); *C04B 24/16* (2013.01); *C04B 28/14* (2013.01); *C04B 38/0067* (2013.01); *C04B 2111/00629* (2013.01); *C04B 2111/10* (2013.01); *C04B 2111/30* (2013.01); *C04B 2111/40* (2013.01); *C04B 2201/20* (2013.01); *Y10T 428/249953* (2015.04); *Y10T 428/31982* (2015.04)

(58) Field of Classification Search
CPC ..... B28B 19/0092; C04B 28/14; C04B 24/16; C04B 24/18; C04B 24/383; C04B 38/10; C04B 40/0263; C04B 38/0067; C04B 2111/40; C04B 2201/20; C04B 2111/00629; C04B 2111/10; C04B 2111/30; B32B 5/245; B32B 13/08; B32B 37/15; Y10T 428/249953; Y10T 428/31982
USPC ......... 428/220, 535, 304.4; 156/45; 106/678
See application file for complete search history.

(56) References Cited

U.S. PATENT DOCUMENTS 2,856,304 A   10/1958  Kirk
7,731,794 B2   6/2010  Yu et al.
(Continued)

OTHER PUBLICATIONS

International Search Report for International Application No. PCT/US2012/027725 dated Sep. 24, 2012.

*Primary Examiner* — Brian Handville
(74) *Attorney, Agent, or Firm* — Eversheds Sutherland (US) LLP; Stacy Fredrich; Ram W. Sabnis

(57) ABSTRACT

A lightweight gypsum wallboard having a foamed gypsum core reinforced with pre-gelatinized, e.g., pre-gelled, starch and prepared by mixing an aqueous foam into a gypsum slurry comprising a source of calcined gypsum (commonly known as plaster of Paris), pre-gelled starch and a lignosulfonate dispersant; allowing the so-formed gypsum slurry to set, and then drying the set gypsum core.

15 Claims, 2 Drawing Sheets

(not to scale)

(51) Int. Cl.
  *C04B 28/14*   (2006.01)
  *C04B 38/00*   (2006.01)
  *B32B 5/24*    (2006.01)
  *B32B 37/15*   (2006.01)
  *C04B 24/16*   (2006.01)
  *C04B 111/40*  (2006.01)
  *C04B 111/00*  (2006.01)
  *C04B 111/10*  (2006.01)
  *C04B 111/30*  (2006.01)

(56) References Cited

U.S. PATENT DOCUMENTS

| | | | |
|---|---|---|---|
| 2007/0059513 | A1  | 3/2007 | Yu et al. |
| 2008/0070026 | A1* | 3/2008 | Yu ............................ B32B 13/08 |
| | | | 428/312.4 |
| 2010/0075167 | A1  | 3/2010 | Gilley et al. |
| 2012/0214887 | A1* | 8/2012 | Stav ......................... C04B 28/14 |
| | | | 521/83 |
| 2012/0237756 | A1* | 9/2012 | Lee ........................... B32B 3/26 |
| | | | 428/312.4 |

* cited by examiner (not to scale)

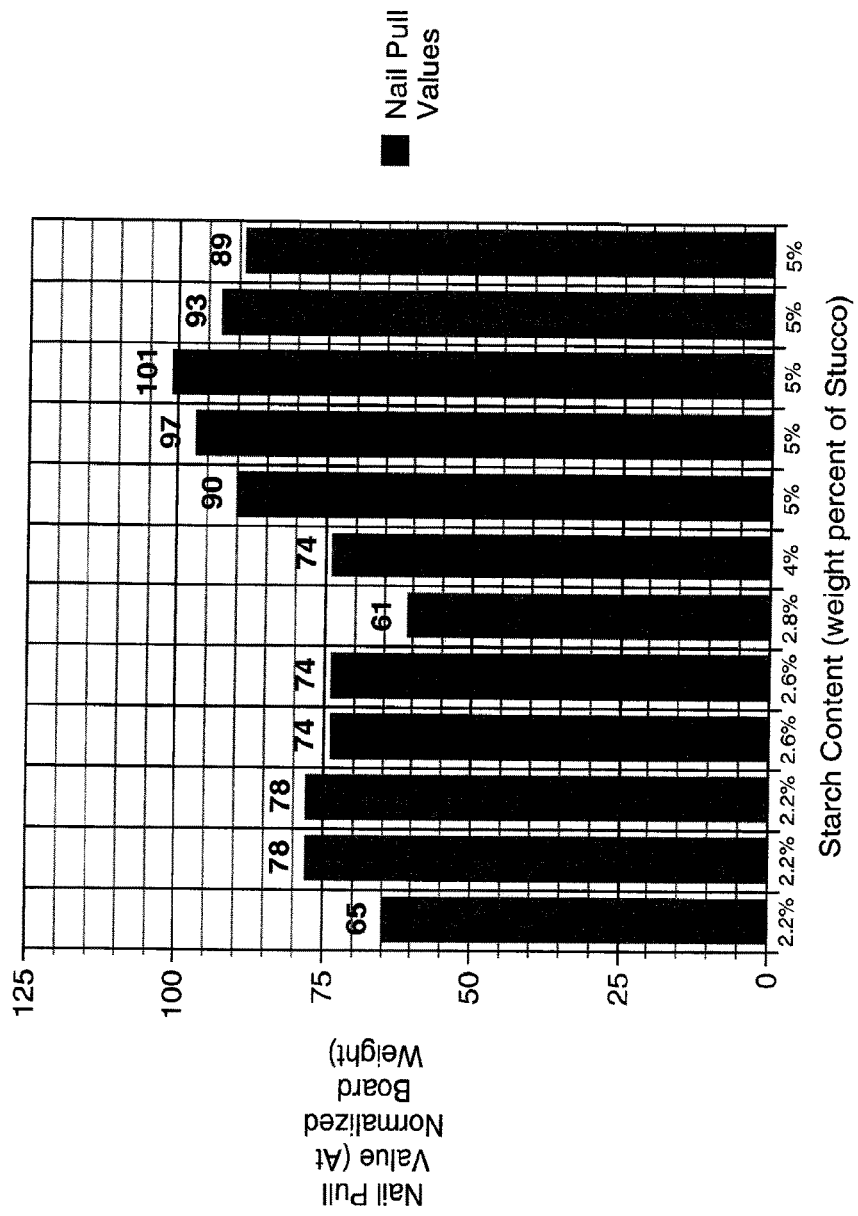

LIGHTWEIGHT GYPSUM WALLBOARD

CROSS REFERENCE TO RELATED APPLICATIONS

This application is a U.S. national stage application of International Application Number PCT/US2012/027725, filed Mar. 5, 2012, which claims priority to U.S. provisional patent application No. 61/451,384 filed Mar. 10, 2011, which is incorporated herein by reference in its entirety.

FIELD OF THE INVENTION

This invention relates to a lightweight gypsum wallboard that has surprisingly good structural properties, especially regarding nail pull. More particularly, the present invention relates to a lightweight, high strength gypsum wallboard having a foamed gypsum core reinforced with pre-gelatinized, e.g., pre-gelled starch. Voids distributed throughout the gypsum core, are created by mixing an aqueous foam into a gypsum slurry comprising a source of calcined gypsum (commonly known as plaster of Paris), pre-gelled starch and a lignosulfonate dispersant; allowing the so-formed gypsum slurry to set, and then drying the set gypsum core.

BACKGROUND OF THE INVENTION

Panels of gypsum wallboard having a core of set gypsum have long been used as structural elements in the fabrication of buildings. Such panels, also commonly known as "wallboard," "drywall," or "plasterboard," are typically used to form the partitions or walls of rooms, elevator shafts, stairwells, ceilings and the like and represent a less costly and more expeditious alternative to conventional plaster walls.

In its most common adaptation, gypsum wallboard is produced by sandwiching a solid gypsum core made from an aqueous slurry of calcined gypsum, usually a slurry of calcium sulfate hemihydrate, between two sheets of a facing material, typically heavy papers. Gypsum wallboard is manufactured continuously at a high speed by continuously depositing the aqueous slurry of calcined gypsum and other ingredients onto one of the two facing sheets and then bringing the second facing sheet into contact with the free surface of the gypsum slurry to form a sandwich-like structure.

Various types of facing materials are known in the art. Multi-ply paper is most commonly used. As an alternative to paper facing sheets, gypsum wallboard can also be manufactured with a fibrous mat (such as a glass fiber mat) and with coated fiber mats as the facing material. Examples of such wallboards include those described, for example, in U.S. Pat. Nos. 4,647,496 and 7,807,592. In addition to improved water resistance, fibrous mat facing materials often provide other significant improvements in strength, performance and other physical attributes.

The calcined gypsum slurry deposited between the two facing sheets, then sets (i.e., the calcined gypsum reacts with water from the aqueous slurry) to form a rigid board-like structure. The so-formed board then is cut into panels of a desired length (for example, eight to sixteen feet). Because the so-formed board contains excess water (water is necessary not only for hydrating the calcined gypsum but also to ensure sufficient fluidity of the gypsum slurry during preparation of the board), the board must then pass through a drying kiln in which excess water is removed and the gypsum wallboard is brought to a final hydrated, but dry state. After the core has been set and is fully dried, the sandwich becomes a strong, rigid, fire-resistant building material.

Certain lightweight gypsum wallboards have recently been described in which the gypsum core is formed from a foamed gypsum slurry comprising calcined gypsum, a pre-gelled starch, naphthalenesulfonate and preferably a trimetaphosphate salt, see U.S. Pat. No. 7,731,794.

Nonetheless, an alternate approach for making a high strength, lightweight wallboard product, which has the structural integrity to withstand the structural and industrial requirements of traditional, heavyweight wallboard products, yet avoids the use of costly naphthalenesulfonate would be useful.

Such a strong, lightweight wallboard should satisfy industry criteria, such as ASTM C-1396, should be cost-effective to manufacture, and should have a strength at least equal to previously known and disclosed wallboard products while reducing the weight of the wallboard significantly. The present invention is directed toward meeting such criteria.

SUMMARY OF THE INVENTION

According to the present invention, a light weight gypsum wallboard having a set gypsum core is prepared from an aqueous gypsum slurry containing as its major ingredients besides water a source of calcined gypsum, as its second most predominant ingredient a pre-gelatinized starch binder, and a lignosulfonate dispersant.

In one embodiment, the aqueous gypsum slurry contains a mixture of water and calcined gypsum at a water:calcined gypsum weight ratio of 0.7:1 to 1.3:1, pre-gelatinized starch in an amount of more than 4% by weight of the calcined gypsum, usually between 4.5% and 10% by weight of the calcined gypsum and most often between 4.5% and 6% by weight of the calcined gypsum and a lignosulfonate dispersant in an amount of at least 0.3% by weight of the calcined gypsum, usually between 0.35% and 1.0% by weight of the calcined gypsum and most often no more than about 0.5%. by weight of the calcined gypsum. The gypsum slurry also includes a surfactant which facilitates the preparation of foam containing entrained air for reducing the density of the set gypsum core. The presence of starch in such amounts in the gypsum core, coupled with the use of a lignosulfonate dispersant, results in a surprising increase in the nail pull performance (ASTM Method C-473) of the lower density set gypsum core.

Another embodiment of the invention constitutes a method of making the gypsum wallboard by preparing a gypsum slurry comprising, and usually consisting essentially of water, a source of calcined gypsum, a pre-gelatinized starch, and a lignosulfonate dispersant. The pre-gelatinized starch is present in an amount of more than 4% by weight and up to about 10.0% by weight based on the weight of the calcined gypsum. Usually, the pre-gelatinized starch is present in an amount of no more than 6% by weight of the calcined gypsum. The lignosulfonate dispersant is present in an amount of at least 0.3% by weight of the calcined gypsum and usually between 0.35% and 1.0% by weight of the calcined gypsum. Usually, the lignosulfonate dispersant is present in an amount of no more than 0.5% by weight of the calcined gypsum. A soap or foam also is added to reduce the density of the final set gypsum wallboard product.

According to the method, a foamed gypsum slurry is deposited on a first facing material, generally a paper cover sheet, and a second facing material, generally another paper cover sheet, is placed over the deposited slurry. Setting of the gypsum slurry forms the gypsum wallboard. After the gypsum slurry has set sufficiently to form a hardened structure, the gypsum wallboard is cut, and the so-cut gypsum wallboard is dried.

As noted below, the gypsum slurry can optionally contain other conventional ingredients including, as appropriate, set accelerators, set retarders, glass fibers, and other known ingredients.

BRIEF DESCRIPTION OF THE DRAWINGS

The objects, features, and advantages of the invention will be apparent from the following more detailed description of certain embodiments of the invention and as illustrated in the accompanying drawings. The drawings are not to scale, emphasis instead being placed upon illustrating the features of the invention.

FIG. 2 is a bar graph showing the influence of starch content on the nail pull values of gypsum wallboards made using a combination of stucco, pre-gelled starch and a lignosulfonate dispersant and normalized to a specific board weight of 1265 pounds/MSF.

DETAILED DESCRIPTION OF THE INVENTION

Figure 1:
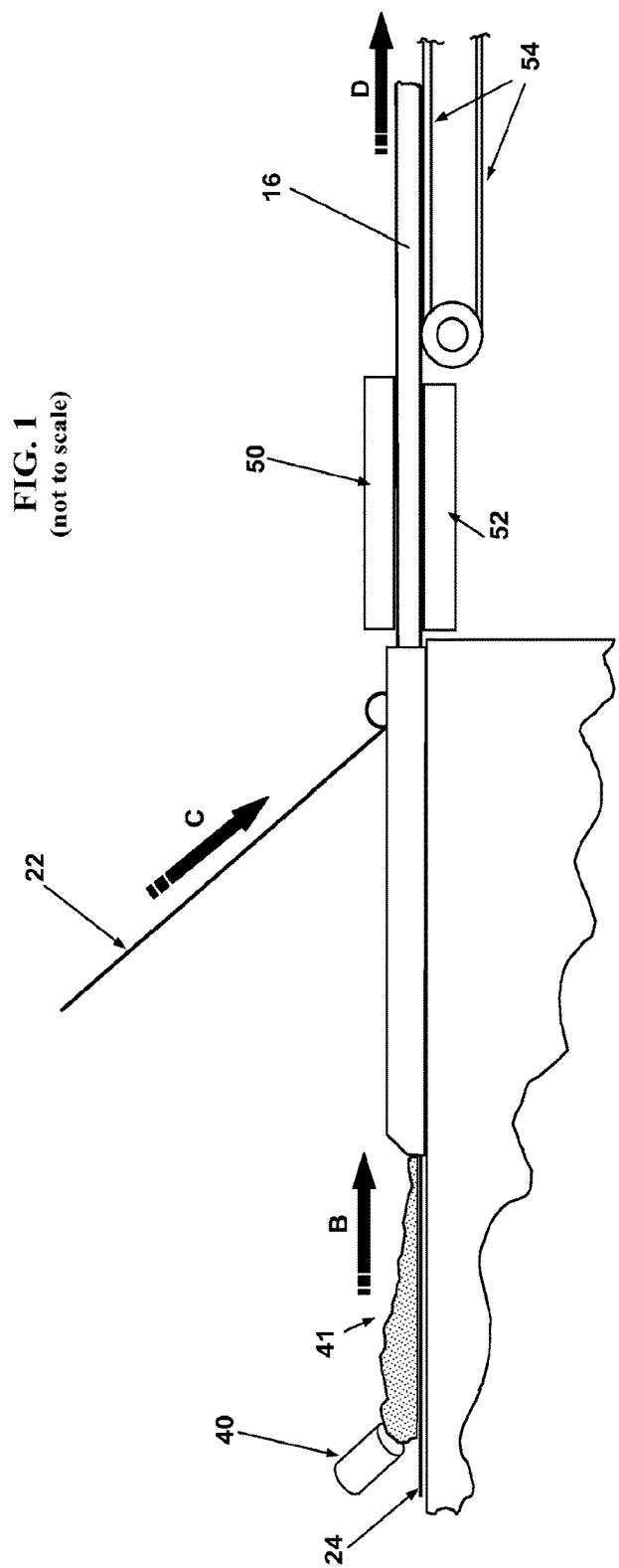
FIG. 1 is a schematic depiction of a process of producing a gypsum wallboard.

The inventors have found that lightweight gypsum wallboards with improved nail pull resistance can be prepared by adding appropriate amounts of both a pre-gelatinized starch and a lignosulfonate dispersant to a calcined gypsum slurry, i.e. to an aqueous slurry made using calcium sulfate hemihydrate (stucco) or calcium sulfate anhydrite. Both the pregelatinized starch and the lignosulfonate dispersant can be pre-blended as dry ingredients with the calcined gypsum before these dry ingredients are mixed with water. The lignosulfonate dispersant may also be available as a liquid and thus can also be added directly to the gypsum slurry or premixed with other liquid ingredients. Both the pregelatinized starch and lignosulfonate dispersants are inexpensive, readily available, and highly effective ingredients.

As in any gypsum wallboard, the first essential ingredient, and the largest single ingredient other than water, in the gypsum slurry is a source of calcined gypsum, usually calcium sulfate hemihydrate, commonly referred to as "stucco" or "Plaster of Paris." Generally, a wide amount of calcined gypsum can be used in preparing the gypsum slurry. The calcined gypsum typically comprises about 30 weight percent to about 60 weight percent of the gypsum slurry, with an amount of 40-50 weight percent being more typical.

This invention is not limited to any particular source of the calcined gypsum and can use a calcined gypsum made from both natural minerals extracted from quarries, and from synthetic gypsums, known as desulfogypsum, produced from the desulfurization of electrical power plant flue gas effluents. Calcined gypsum made from a combination of natural and synthetic gypsum also can be employed. Following hydration and drying, the set gypsum typically constitutes more than 85% by weight of the set gypsum core.

Whether natural rock or synthetic, the gypsum is typically dried, ground, calcined, and stored as stucco, which is calcium sulfate hemihydrate. The drying step of stucco manufacture includes passing crude gypsum rock through a rotary kiln to remove free moisture, and then grinding the rock to a desired fineness, using for example a roller mill. The dried, ground gypsum, often referred to as "land plaster," then is heated in a "calciner" to remove water of hydration and yield the calcined gypsum that exhibits the valuable property of being chemically reactive with water, and setting to form a rigid structure. Actually, there are two forms of stucco, alpha ($\alpha$) calcium sulfate hemihydrate and beta ($\beta$) calcium sulfate hemihydrate. As appreciated by those skilled in the art, these two types of stucco are produced by different calcination procedures. The present invention can generally use either the beta or the alpha form of stucco; though as is the case in conventional gypsum wallboard production, the less costly beta form is usually used.

In accordance with the present invention, the calcined gypsum is mixed, typically in a "pin" mixer, with other additives, including as essential components water, a pregelatinized starch and a lignosulfonate dispersant to form a gypsum slurry. The gypsum slurry is formed into long continuous sheets between two layers of facing material. In an alternative approach, the gypsum slurry may be placed in a mold.

To reduce the density of the core and therefore the overall weight of a gypsum wallboard, a pre-generated foam containing entrained air also is blended into the gypsum slurry. Conventional gypsum wallboard, at a nominal thickness of ½ inch, typically is prepared at a weight between about 1600 to 1800 pounds per 1,000 square feet (MSF) of board (about 7,800 Kg to about 8,300 Kg per thousand square meters). This corresponds to a board density of about 38 to about 43 lbs. per cu. ft. (about 0.61 to 0.69 g/cc). Gypsum wallboards prepared in accordance with the present invention will preferably have a reduced density relative to a standard wallboard. Reducing the weight of each gypsum wallboard panel by as little as 30 pounds/MSF can result in significant savings. In particular, by adjusting the proportion of foam in the gypsum slurry, the set gypsum core of the present invention can have a much lower density than commercially available gypsum products. Usually, a gypsum wallboard of the present invention at a nominal thickness of ½ inch has a weight between about 1000 to 1300 pounds per MSF of board. This corresponds to a density of about 24 to about 31 lbs. per cu. ft (about 0.38 to 0.50 g/cc). Historically, the degree to which the density (and thus the weight) of a gypsum wallboard could be decreased has been limited by the performance of the wallboard in the nail pull test, i.e., the amount of force required for the board to be pulled over the head of a nail. Through the use of starch, a lignosulfonate dispersant and an appropriate amount of foam, the present invention reduces the density of the gypsum wallboard while maintaining sufficient board strength and other physical properties, particularly nail pull values.

Generally, any foam can be added to the slurry composition. Often referred to also as soap, the pre-generated foam is prepared by mixing water with a surfactant and air or another gas. Any of the known frothing agents, or "foaming agents" can be employed as a surfactant in the practice of the present invention. The term "foaming agent", as used herein, means a substance that can introduce fine gas bubbles into the gypsum slurry of the present invention. Typical foaming agents are anionic, nonionic, or cationic surfactants. In particular, the class of anionic substances comprising organosulfonates or organosulfates may be employed. Typically, these include the alkylaryl sulfates or alkylaryl sulfonates, for example, ammonium salts of alkylbenzenesulfonates, lauryl sulfate or alkylglycolether sulfate. The alkyl groups may be linear or branched. Also suitable for use with the present invention are ammonium ether sulfates, such as Cedepal™ FA-406 and Alpha Foamer™ which are commercially available from Stepan Company. The foaming agent, in accordance with the present invention, is preferably used at a level necessary to make a foam of a sufficiently low density to provide a gypsum wallboard of the desired density.

The next essential ingredient, and the second largest ingredient other than water, in the gypsum slurry is a source of pre-gelatinized starch. The pre-gelatinized starch is present in an amount of more than 4% by weight and up to about 10.0% by weight based on the weight of the calcined gypsum. Usually, the pre-gelatinized starch is present in an amount of no more than 6% by weight of the calcined gypsum. In one embodiment, the pre-gelatinized starch is supplied as a dry powder, in particular a dry hydroxyalkylated pre-gelantinized starch, and is added to the dry calcined gypsum prior to forming the gypsum slurry. Starch (CAS #9005-25-8, chemical formula $(C_6H_{10}O_6)_n$), is a polysaccharide carbohydrate comprising a large number of glucose monosaccharide units joined together by glycosidic bonds. Starch is predominantly present in plants and seeds as amylose and amylopectin. Depending on the plant, starch generally contains 20 to 25 percent amylose and 75 to 80 percent amylopectin. Polysaccharide starches include maize or corn, waxy maize, potato, cassava, tapioca and wheat starch. Other starches include varieties of rice, waxy rice, pea, sago, oat, barley, rye, amaranth, sweet potato, and hybrid starches available from conventional plant breeding, e.g., hybrid high amylose starches having amylose content of 40% or more, such as high amylose corn starch. Also useful are genetically engineered starches such as high amylose potato and waxy potato starches.

The starch is pre-gelatinized. "Pre-gelatinized starch," which is also termed cold-swelling starch, has been chemically and/or mechanically processed to rupture all or part of the starch granules. In contrast to native or raw starch, a pre-gelatinized starch is generally soluble in cold water, or at least readily forms dispersions, pastes, or gels with cold water, depending on the concentration of the pre-gelatinized starch used and on the type of starch used to produce the pre-gelatinized starch.

As known to those skilled in the art, pre-gelatinized starch can be made by a variety of processes, including wet-thermal digestion using a roller dryer, mechanical, and thermal treatment with an extruder, or exclusively mechanical treatment with a vibratory mill. In such processes the starch grain structure and the para-crystalline molecular organization is disrupted, and the starch is converted into an amorphous substance. In addition to pre-gelatinization, the starches can be further physically modified, e.g., by extrusion, spray drying, drum drying, and agglomeration.

Suitable starches also can be chemically modified or derivatized, such as by etherification, esterification, acid hydrolysis, dextrinization, crosslinking, cationization, heat-treatment or enzyme treatment (e.g., with alpha-amylase, beta-amylase, pullulanase, isoamylase, or glucoamylase). Exemplary modified starch includes a hydroxyalkylated starch, such as a hydroxypropylated or hydroxyethylated starch, or a succinated starch, such as octenylsuccinated or dodecylsuccinated starch. Low amylose starches also can be used. As used herein, the term "low amylose" is intended to include starches containing less than 40% by weight amylose. One commercially available starch is hydroxypropylated starch available from National Starch and Chemical Company. Other commercially available types of starches are waxy starches, also available from National Starch and Chemical Company. As used herein, the term "waxy" is intended to include a starch containing at least 95% by weight amylopectin.

In a specific embodiment, the pre-gelatinized starch is any native or modified starch having a modulus of less than 100 Pa at $10^{-1}$ rad/s, at 25° C., and at 5% by weight solids dissolved in water. Exemplary starches include those that are stabilized, including hydroxyalkylated starches such as hydroxypropylated or hydroxyethylated starches, and acetylated starches. In another embodiment, suitable starches include dextrinized starches. In a further embodiment, suitable starches include modified waxy and modified high amylose starches. Non-limiting examples of highly converted starches are highly converted sago, highly converted tapioca, and highly converted corn starch. Converted starch is starch that has been changed to a lower molecular form through various modifications. Modifications to convert starch to lower molecular weight are well known in the art. In one embodiment, such starches have a low viscosity, with a water fluidity in the range of from 40 to 90. In another embodiment, the starches will have a water fluidity in the range of 65 to 85. Water fluidity is known in the art and, as used herein, is measured using a Thomas Rotational Shear-type Viscometer (commercially available from Arthur A. Thomas Co., Philadelphia, Pa.), standardized at 30° C. with a standard oil having a viscosity of 24.73 cps, which oil requires 23.12.+−.0.05 sec for 100 revolutions. Accurate and reproducible measurements of water fluidity are obtained by determining the time which elapses for 100 revolutions at different solids levels depending on the starch's degree of conversion: as conversion increases, the viscosity decreases. The conversion may be by any method known in the art including oxidation, enzyme conversion, acid hydrolysis, heat, and/or acid dextrinization.

Thus, in one embodiment the pre-gelatinized starch comprises a pre-gelatinized starch that has been chemically modified with a mono-reactive moiety to a degree of substitution of at least 0.015. In a particular embodiment, the pre-gelatinized starch is selected from the group consisting of ether and ester derivatives of starch, such as hydroxypropyl, hydroxyethyl, succinate, and octenyl succinate starch. In one specific embodiment the starch is a hydroxypropylated potato starch having a degree of substitution of 0.015-0.30 and a molecular weight of 200,000-2,000,000 Daltons. Another specific embodiment comprises hydroxyethylated dent corn starch having a degree of substitution of 0.015-0.3 and a molecular weight of 200,000-2,000,000 Daltons. Another specific embodiment comprises hydroxypropylated high-amylose corn starch with a degree of substitution of 0.015-0.3 and a molecular weight of 200,000-2,000,000 Daltons.

A variety of different types of pre-gelatinized starch are commercially available and can be used. An exemplary pre-gelatinized starch material is cold-water-soluble granular pre-gelatinized starch materials produced, for example, as described in U.S. Pat. No. 4,465,702 to Eastman et al. A pregelatinized corn starch of this type is available under the trade name MIRAGEL® 463, manufactured by the A. E. Staley Manufacturing Company, which thickens and sets to a gel using room temperature water. Other pregelatinized starches that can be used include Ultra Sperse® M, from National Starch and Chemical Company of Bridgewater, N.J.; pre-gelatinized waxy corn starch, available from National Starch and Chemical Company; and a pre-gelatinized, hydroxyethylated dent corn starch available under the trade name Staramic® 747, from A. E. Staley Mfg. Co. of Decatur, Ill.; and the hydroxyethylated dent corn starches available under the trade names ETHYLEX® 2005-2095 from Tate & Lyle, UK. Other useful starches include, but are not limited to, pregelatinized rice starch and pregelatinized wheat starch.

While the relative amount of the pre-gelatinized starch and the stucco can be varied, depending on (i) the desired properties of the gypsum wallboard, (ii) the type of pre-gelatinized starch, (iii) the nature of the calcined gypsum used, and (iv) the presence and amounts of other optional additives, it is important that the starch constitute more than 4% by weight of the calcined gypsum. Usually, the starch will comprise between 4.5% and 6% by weight of the calcined gypsum. As shown in the following examples, applicants have determined that by using the combination of this quantity of pre-gelled starch and a suitable quantity of a lignosulfonate dispersant, one is able consistently to make a lower density gypsum wallboard having acceptable nail pull values.

The final essential component of the gypsum slurry of the present invention is a lignosulfonate dispersant (also known as sulfonated lignin dispersant). The lignosulfonate dispersant is present in an amount of at least 0.3% by weight of the calcined gypsum and usually between 0.35% and 1.0% by weight of the calcined gypsum. Usually, the lignosulfonate dispersant is present in an amount of no more than 0.5% by weight of the calcined gypsum. While it was previously known to use lignosulfonate as a fluidity-enhancing and/or water-reducing agent (dispersant) in the production of gypsum wallboards (see for example U.S. Pat. No. 5,286,412 the disclosure of which is incorporated herein by reference), the ability of lignosulfonates, in the amount specified hereafter, to augment the performance of pre-gelatinized starch in a gypsum wallboard, such that one can now produce a low density wallboard having satisfactory nail pull performance, was not expected. The lignosulfonate dispersant can be added as a solid, along with other solids, directly to the mixing operation (e.g., to the pin mixer) or can be supplied in liquid form separately, or with other liquid additives.

Lignosulfonates used in the present invention are water soluble, sulfite lignin byproducts recovered directly from the pulping of cellulosic materials using the sulfite process and are the principle constituent of spent sulfite liquor (SSL). By adding an excess of calcium hydroxide to the spent liquor, calcium lignosulfonates are precipitated and can be recovered. Ultrafiltration and ion-exchange also can be used to recover lignosulfonates from the spent liquor. A variety of other metal lignosulfonates also can be obtained using a variety of base exchange techniques.

Lignosulfonates, i.e., sulfonated lignin material, alternatively can be produced by sulfonating the Kraft lignin recovered as a by-product when pulping cellulosic materials using the Kraft process. Kraft lignin refers to the lignin containing material typically recovered from alkaline pulping black liquors, such as are produced in the Kraft, soda and other well known alkaline pulping operations. Sulfonated lignin is obtained by the introduction of sulfonic acid groups into the Kraft lignin molecule, as may be accomplished by reaction of Kraft lignin with sulfite or bisulfite compounds, so that the Kraft lignin is rendered water soluble.

In the present application, the term "lignosulfonate" therefore encompasses not only the sulfite lignin, but also sulfonated lignin, both of which are commercially available. The lignin source for obtaining the lignosulfonate may be any common cellulosic material including hardwoods and softwoods and may be either crude or pure. Lignin recovered from the preparation of paper grade quality pulp is suitable. Typically, the lignosulfonate appears as one of its alkali metal, alkaline earth or other metal salts such as sodium, potassium, calcium, magnesium or ammonium lignosulfonate. Specific lignosulfonate dispersants can be selected, for example, from calcium lignosulfonates, iron lignosulfonates, cobalt lignosulfonates, ammonium lignosulfonates, and sodium lignosulfonates. Lignosulfonates are commercially available from numerous sources including Mead-Westvaco Corporation and LignoTech USA, Inc (Borregaard LignoTech). One particularly useful lignosulfonate dispersant is MARASPERSE C-21 available from LignoTech USA.

As known, a substantial amount of water also is needed to be included in the gypsum slurry to ensure proper flowability of the slurry. Water is added to the process to hydrate the calcined gypsum, to provide needed fluidity and to make the foam. As is the case in conventional wallboard production, most of this water must eventually be driven off by heating the set gypsum wallboard. Thus, the lower the amount of water used, the lower the drying costs.

In the practice of the present invention, the weight ratio of water to calcined gypsum can range over a fairly wide range of weight ratios (i.e. weight of water divided by weight of calcined gypsum). Usually, the water-to-calcined gypsum weight ratio (water:calcined gypsum) is established in the range of about 0.5:1, to about 1.5:1, usually about 0.7:1 to about 1.3:1.

In addition to the calcined gypsum, the pre-gelatinized starch, such as a hydroxyalkylated pregelatinized corn starch, the lignosulfonate dispersant and the foaming agent, the gypsum slurry may also include other optional additive(s) known in the art for making conventional gypsum wallboard, such as set retarders, set accelerators, biocides (mold and mildew control agents), fillers, water resistance additives (such as a wax or a wax emulsion), fire retardants, glass fibers and combinations thereof. One desirable set accelerator illustrated in the following examples is prepared by dry grinding a mixture of land plaster (calcium sulfate dihydrate) and a lignosulfonate. Set accelerators made using a small amount of other additives for the land plaster (normally at a level of about 5% by weight of the land plaster) include sugar, dextrose, boric acid, and starch. Such set accelerators are generally used in an amount below about 0.1% by weight of the calcined gypsum.

Applicant specifically contemplates preparing the lightweight gypsum wallboard of the present invention in the absence of sodium trimetaphosphate. As the test results presented hereafter demonstrate, gypsum wallboards with acceptable strength properties, specifically improved nail pull performance, have been obtained using suitable amounts of a pre-gelled starch and a lignosulfonate dispersant in the absence of any sodium trimetaphosphate (STMP). Accordingly, the present invention is also directed to other embodiments where the gypsum slurry consists essentially of calcined gypsum, a pregelatinized starch, and particularly a hydroxyalkylated pre-gelatinized corn starch, a lignosulfonate dispersant and other additive(s) known in the art, such as foaming agents, set retarders, set accelerators, biocides (mold and mildew control agents), fillers, glass fibers, water resistance additives, fire retardants, and combinations comprising at least one of the foregoing and also possibly including strength-enhancing agents, such as polymeric binders, but excluding sodium trimetaphosphate. Exemplary polymeric binders include acrylic latexes and other vinyl homopolymers and copolymers, including polyvinyl acetate and a copolymer of vinyl acetate with another vinyl monomer such as ethylene. In still another embodiment, the present invention includes an aqueous gypsum slurry composition that consists of calcined gypsum, a pre-gelled starch, a lignosulfonate dispersant and an additive selected from foaming agents, set retarders, set accelerators, mold and mildew control agents, fillers, glass fibers, water resistance additives, strengthening agents but excluding sodium trimetaphosphate, and combinations comprising at least one of the foregoing.

The test results presented hereafter also specifically demonstrate, that lightweight gypsum wallboards with acceptable strength properties, specifically improved nail pull performance, have been obtained in the absence of any other strength-enhancing additives, such as sodium trimetaphosphate, polymeric binders, and others. Thus, in this additional embodiment, the aqueous gypsum slurry consists essentially of calcined gypsum, pre-gelatinized starch, in particular a hydroxyalkylated pre-gelatinized corn starch, a lignosulfonate dispersant and other additive(s) known in the art, such as foaming agents, set retarders, set accelerators, biocides (mold and mildew control agents), fillers, glass fibers, water resistance additives, fire retardants, and combinations comprising at least one of the foregoing, and not strength-enhancing agents such as polymeric binders and sodium trimetaphosphate. In particular, in such embodiment, the aqueous gypsum slurry consists of calcined gypsum, pre-gelatinized starch, lignosulfonate dispersant and additive(s) selected from foaming agents, set retarders, set accelerators, mold and mildew control agents, fillers, glass fibers water resistance additives, and combinations comprising at least one of the foregoing, and not any further strengthen-enhancing agents (such as sodium trimetaphosphate or polymeric binders).

A method for preparing a wallboard in accordance with the present invention is illustrated schematically in FIG. 1. In the usual design, the calcined gypsum is fed into the top of a mixer of the type commonly referred to as a pin mixer (not shown) along with other dry components. In particular, the dry pre-gelatinized starch, stucco, a dry lignosulfonate dispersant (e.g., MARASPERSE C-21) and any other optionally included dry components from which the gypsum slurry is formed can be pre-mixed and then fed as a dry mixture to the pin mixer. Water and other liquid constituents (e.g., soap or foam, prepared separately using high shear mixing and used to control the slurry density), used in forming the gypsum slurry, are also metered into the pin mixer through other ports where they are combined with the dry components to form an aqueous gypsum slurry 12, which emerges from a discharge conduit 11 of the pin mixer. The residence time in the pin mixer usually is very short.

The slurry is deposited through one or more outlets of the discharge conduit 11 onto a continuous, horizontally moving lower facing sheet 10 comprising a fibrous facing material (e.g., multi-ply paper) which is slightly wider than the desired width of the wallboard. The lower facing sheet 10 and the deposited gypsum slurry 12 move in the direction of arrow A. An upper facing sheet 13, also comprising fibrous material such as heavy paper, is fed in the direction of arrow B from a roll (not shown) and applied to the upper surface of the gypsum slurry 12. The "sandwich" of slurry and adjacent facing sheets is then passed through a mold or other forming device (rollers, guides, or plates (14 and 15)) for establishing the desired width and thickness of the gypsum board. The amount of slurry deposited can be controlled in a manner known in the art such that it, in cooperation with plates 14 and 15 and the facing sheets 10 and 13, form a board of the desired width and thickness. Facing sheets 10 and 13 are usually of a type of multi-ply paper commonly used for the face sheet of wallboard products. Such paper products are well known to those skilled in the art.

The lower facing sheet 10 is fed from a roll (not shown). Prior to receiving the gypsum slurry 12, the lower facing sheet 10 can be scored by one or more scoring devices, allowing the edges of lower facing sheet 10 to be folded upward and around the deposited gypsum slurry. These edges can then be glued to overlapping portions of an upper facing sheet 13 according to methods known in the art. Prior to applying the (upper) facing sheet 13 to the upper surface of the gypsum slurry, glue is applied to the facing sheet along portions of the sheet that will overlap and be in contact with the folded-over mat edges (glue application is not shown).

Though not shown, the present invention also contemplates that a minor portion of the gypsum slurry may be discharged through an appropriate outlet to provide a relatively thin layer of gypsum slurry on the inner surface of facing sheets 10 and 13. The thin layer of gypsum slurry is somewhat denser than the aqueous slurry of gypsum used to form the main portion of the set gypsum core (main core slurry discharged through outlet 11 to form gypsum slurry layer 12). This higher density region of the core is intended to penetrate into the interstices of the fibrous facing material to assist in the formation of a strong bond between the lower density portion of the core and the facing sheets. Typically, the slurry used to form the thin layer is about 18-20% more dense than the density of the slurry used to form the main portion of the set gypsum core. In addition, it also is contemplated that some of this higher density gypsum slurry also can be used to form streams of gypsum slurry at each of the edges of the facing sheets to form hard edges of the wallboard. Way of forming the so-called slate coat and hard edges are known in the art and merely constitute optional aspects of the present invention.

The nascent board 16 then travels undisturbed on rollers or on a conveyor 17 in the direction of arrow C for several minutes. During this time, the slurry is allowed to set and form the hardened gypsum core by hydration of the stucco. During this setting process, the core hardens as the gypsum mineral (calcium sulfate dihydrate) is formed.

Wallboard panels are then cut to length, flipped, and fed to a large continuous oven for drying. The individual boards are then typically taped face-to-face in pairs and stacked for shipment. For molded articles, the gypsum slurry is alternatively introduced directly into a mold and the slurry sets to form the article.

As noted above, the slurry generally contains more water than necessary solely to reconstitute the gypsum from stucco. This extra water is used in the board forming stage to reduce the stucco slurry viscosity sufficiently to allow for its even distribution (e.g., by using a forming roll) across and between the facing sheets at a desired thickness. As a result of the use of excess water, the gypsum board remains wet after hydration (although it is possible at this point the board can be cut to desired dimensions). Therefore, the formed board is ultimately dried.

The drying operation typically involves applying heat by circulating hot air (e.g., in a drying oven) around the wet gypsum board to evaporate the excess water. It is necessary, therefore, that the facing sheets be sufficiently porous to allow this excess water to readily evaporate without adverse effects such as delamination, tearing, bursting, etc. of the facing sheets. The ability of the facing sheets to easily allow the escape of water vapor also promotes a uniform degree of dryness. This improves overall board quality, since insufficiently dried gypsum board presents storage problems, while over-drying leads to calcination and causes a loss of mechanical strength. Typical drying conditions involve maintaining an ambient or surrounding hot air temperature from 200° F. to 600° F. (about 95° C. to 315° C.) for a drying time from 10 minutes to 2 hours. For example, at line speeds of about 70 to about 600 linear feet per minute, drying times of about 30 to about 60 minutes are typical. These parameters are exemplary and are influenced by the particular configuration of the board manufacturing line.

As noted in the background, the facing sheets can comprise any fibrous material known to be suitable for facing gypsum board. Specific materials include paper, such as heavy, single or multi-ply paper (e.g., medium or heavy Kraft paper, manila paper, etc.) and cardboard. Multi-ply paper used for the facing sheet of gypsum board products typically has a basis weight from 50 to 60 pounds per 1000 MSF, an overall caliper of 250 to 350 microns, and a Gurley porosity from 15 seconds to 145 seconds. Often, different types of paper are used for each gypsum board surface. For example, manila paper is frequently used on one side, while newsliner is used on the opposite side. Paper and cardboard facing materials are normally made from recycled fibers (e.g., used corrugated paper, Kraft cuttings, or waste newsprint), but they can also be partially or wholly made from virgin fibers. Other natural or synthetic fibrous materials also can be used, including those derived from metals or glass (e.g., fiberglass mat, chopped or continuous strand mat, or glass roving, both woven and non-woven). Examples of fibrous non-woven mats are found in U.S. Pat. Nos. 4,647,496; 5,883,024; and 6,770,354. Other useful materials for the facing sheet include filament forming synthetic organic polymers (e.g., nylon, polyesters, polypropylene, polyethylene, rayon, and cellulosics), ceramics, cotton, cloth, hair, felt, and the like. Fibrous mats can be bound with, or coated with a resin binder. Multiple layers of fibrous materials, for example a composite sheet of a glass mat and Kraft paper, can also be used.

Gypsum boards produced in accordance with the present invention have excellent aesthetic and mechanical properties, including good strength. For example, in a nail pull resistance test as described below, boards that are up to 1400 lbs per MSF and lighter show adequate nail pull resistance.

In a further embodiment, the present invention is:

1. A gypsum slurry suitable for producing a lightweight gypsum board comprising an aqueous mixture of calcined gypsum, a pre-gelatinized starch in an amount of more than 4% by weight of the calcined gypsum, and a lignosulfonate dispersant in an amount of at least 0.3% by weight of the calcined gypsum.

2. The gypsum slurry of the preceding and subsequent embodiments having a sufficient amount of a foam to cause the slurry to hardened to a density of at least 28 pounds be cubic foot, and/or to a density of no more than 31 pounds per cubic foot.

3. The gypsum slurry of the preceding and subsequent embodiments wherein the foam comprises an ammonium ether sulfate surfactant.

4. The gypsum slurry of the preceding and subsequent embodiments having a water to calcined gypsum (water:calcined gypsum) weight ratio in the range of 0.5:1 to 1.5:1, or in the range of 0.7:1 to 1.3:1.

5. The gypsum slurry of the preceding and subsequent embodiments wherein the pre-gelatinized starch is in an amount of from 4.5% to 10%, or 4.5% to 6.0%, by weight of the calcined gypsum.

6. The gypsum slurry of the preceding and subsequent embodiments wherein the lignosulfonate dispersant is in an amount of from 0.35% to 1.0%, or 0.35% to 0.5%, by weight of the calcined gypsum.

7. The gypsum slurry of the preceding embodiments wherein no additional binder and specifically no sodium trimetaphosphate is present.

8. A lightweight gypsum wallboard comprising a set gypsum core containing a pre-gelatinized starch and a lignosulfonate dispersant, wherein the set gypsum core, formed by hydration of calcined gypsum supplied in a gypsum slurry, is sandwiched between two facing sheets of a fibrous material and wherein the pre-gelatinized starch is present in an amount of more than 4% by weight of the calcined gypsum, and the lignosulfonate dispersant is present in an amount of at least 0.3% by weight of the calcined gypsum.

9. The lightweight gypsum wallboard of the preceding and subsequent embodiments having a sufficient amount of a foam in the gypsum slurry to cause the slurry to hardened to a density of at least 0.28 pounds per cubic foot and/or to a density of no more than 31 pounds per cubic foot.

10. The lightweight gypsum wallboard of the preceding and subsequent embodiments wherein the foam comprises an ammonium ether sulfate surfactant.

11. The lightweight gypsum wallboard of the preceding and subsequent embodiments having a water to calcined gypsum (water:calcined gypsum) weight ratio the range of 0.5:1 to 1.5:1, or in the range of 0.7:1 to 1.3:1.

12. The lightweight gypsum wallboard of the preceding and subsequent embodiments wherein the pre-gelatinized starch is in an amount of from 4.5% to 10%, or from 4.5% to 6.0%, by weight of the calcined gypsum.

13. The lightweight gypsum wallboard of the preceding and subsequent embodiments wherein the lignosulfonate dispersant is in an amount of from 0.35% to 1.0%, or from 0.35% to 0.5%, by weight of the calcined gypsum.

14. The lightweight gypsum wallboard of the preceding and subsequent embodiments wherein no additional binder and specifically no sodium trimetaphosphate is present.

15. The lightweight gypsum wallboard of the preceding embodiments having a nominal thickness of ½ inch and a weight of from 1000 to 1300 pounds per MSF of board, wherein the two facing sheets are paper and the pre-gelatinized starch is a hydroxyalkylated corn starch.

16. A method for making a gypsum wallboard comprising: forming a foamed gypsum slurry from water, calcined gypsum, a pregelatinized starch in an amount of more than 4% by weight of the calcined gypsum, a lignosulfonate dispersant in an amount of at least 0.3% by weight of the calcined gypsum and a surfactant; applying the foamed gypsum slurry to lower facing sheet of a fibrous material to form a core layer; applying an upper facing sheet of a fibrous material to the upper surface of the foamed gypsum slurry to form a sandwich of foamed gypsum slurry between the lower and upper facing sheets; and heating the sandwich sufficiently to dry the core layer to form the gypsum wallboard.

17. The method of the preceding and subsequent embodiments wherein the surfactant comprises an ammonium ether sulfate.

18. The method of the preceding and subsequent embodiments having a water to calcined gypsum (water:calcined gypsum) weight ratio in the range of 0.5:1 to 1.5:1, or in the range of 0.7:1 to 1.3:1.

19. The method of the preceding and subsequent embodiments wherein the pre-gelatinized starch is in an amount of from 4.5% to 10%, or from 4.5% to 6.0% by weight of the calcined gypsum.

20. The method of the preceding and subsequent embodiments wherein the lignosulfonate dispersant is in an amount of from 0.35% to 1.0%, or from 0.35% to 0.5%, by weight of the calcined gypsum.

21. The method of the preceding embodiments wherein no additional binder and specifically no sodium trimetaphosphate is present is present in the foamed gypsum slurry.

It will be understood that while the invention has been described in conjunction with specific embodiments thereof, the foregoing description and examples are intended to illustrate, but not limit the scope of the invention. In particular, the above-described compositions and methods are further described by examples, which are set forth as representative. They are not to be construed as limiting the scope of the invention as these and other equivalent embodiments will be apparent in view of the present disclosure and appended claims. Other aspects, advantages and modifications are within the scope of the invention.

Example 1 Preparation of Wallboards

All of the tested wallboards were made using core formulations presented in Table 1 below (all amounts are reported in grams). As shown, all of the formulations included calcined gypsum (calcium sulfate hemihydrate or stucco), water, a pre-gelled starch (Starmic 747) a lignosulfonate dispersant (Marasperse C-21), a set accelerator (a ball milled blend of about 86% by weight land plaster and 14% by weight of a lignosulfonate) and a surfactant (Cedepal FA-106) for developing a lightweight foam solution.

TABLE 1

| Sample Formulation | Water | Stucco | Starch[1] | Surfactant[2] | Set Accelerator[3] | Lignosulfonate[4] |
|---|---|---|---|---|---|---|
| 1 | 130 | 112 | 2.5 | 0.17 | 0.1 | 0.5 |
| 2 | 130 | 112 | 2.5 | 0.16 | 0.1 | 0.5 |
| 3 | 130 | 112 | 2.5 | 0.15 | 0.1 | 0.5 |
| 4 | 130 | 125 | 3.4 | 0.2 | 0.1 | 0.5 |
| 5 | 130 | 125 | 3.4 | 0.2 | 0.1 | 0.5 |
| 6 | 130 | 122 | 3.4 | 0.2 | 0.1 | 0.5 |
| 7 | 125 | 112 | 4.5 | 0.17 | 0.1 | 0.5 |
| 8 | 130 | 102 | 5.1 | 0.2 | 0.1 | 0.5 |
| 9 | 130 | 112 | 5.6 | 0.2 | 0.1 | 0.5 |
| 10 | 125 | 112 | 5.6 | 0.15 | 0.1 | 0.5 |
| 11 | 125 | 112 | 5.6 | 0.15 | 0.1 | 0.5 |
| 12 | 130 | 112 | 5.6 | 0.2 | 0.1 | 0.5 |

[1]Starmic 747;
[2]Cedepal FA-106;
[3]ball milled blend of about 86% by weight land plaster and 14% by weight of a lignosulfonate and
[4]Marasperse C-21

The stucco, starch, lignosulfonate dispersant and set accelerator were dry blended and added to a solution of the water and surfactant. The resulting slurry was mixed for 30 seconds in a malted-mix blender (Oster, Drink Mixer, Model 40). The resulting foamed slurry was poured into a square mold (4 inches by 4 inches) to form ½ inch thick board samples (faced with paper having a basis weight of 51 pounds/MSF).

Following casting of the boards, they were initially heated in an oven set at a high temperature (104° C.) for 30 minutes in order to initiate the migration of excess water from the board. Drying to a constant weight was accomplished in a forced-air oven set at 110° F. (about 43° C.). This drying program assured that the drying process did not cause surface calcination which might effect testing. After drying to a constant weight, nail pull tests were conducted on the samples in accordance with ASTM C-473.

Example 2 Nail Pull Testing

One type of gypsum wallboard failure occurs when a fastener head, such as a nail head, is pulled through a panel of the gypsum wallboard. The strength measure of a gypsum wallboard panel for this type of failure is known as nail pull resistance. Standardized tests to measure nail pull resistance (e.g. ASTM C 473), typically measure the ability of a gypsum wallboard to resist pull-through of a standard size nail head through the product. In particular, the nail pull test measures a wallboard's ability to resist penetration of a one quarter inch diameter "nail head." The standard specifies a 77 pound nail pull for a ½ thick gypsum wallboard.

Testing of the board compositions made using the formulations illustrated in Table 1 was performed. One manner in which to measure the strength of a wallboard product is the nail pull test, performed according to ASTM C-473 ("Physical Testing of Gypsum Wallboard Products"). This test requires a minimum-pull force value of 77 pounds or pounds-force. The measurements reported herein were determined with United testing equipment.

As reflected in Table 1, the various gypsum wallboard samples were made using similar amounts of additives and components, differing principally in the amount of the pre-gelled starch. Gypsum wallboards made in accordance with the invention used starch in an amount (weight) of about 5 percent of the weight of the stucco (calcium sulfate hemihydrate) used. The amounts of surfactant added, for producing the low-density foam, as well as the water-to-stucco weight ratio, also were varied slightly to produce boards of differing weights.

The resultant board weights, in pounds per 1,000 square feet (MSF) of one-half inch thick board, and the corresponding nail pull result obtained from that board are shown in Table II.

TABLE 2

| Sample Formulation | Board Weight (lb/MSF) | Measured Nail Pull (pounds) | Normalized Nail Pull (pounds) |
|---|---|---|---|
| 1 | 923 | 47.4 | 65 |
| 2 | 885 | 42.2 | 78 |
| 3 | 1039 | 64.3 | 78 |
| 4 | 1062 | 62.3 | 74 |
| 5 | 1106 | 67.6 | 74 |
| 6 | 969 | 46.9 | 61 |
| 7 | 1113 | 65.2 | 74 |
| 8 | 1032 | 73.3 | 90 |
| 9 | 1072 | 74.1 | 97 |
| 10 | 1329 | 106.1 | 101 |
| 11 | 1262 | 92.6 | 93 |
| 12 | 1190 | 83.9 | 89 |

By normalizing the data to a board weight of 1265 pounds/MSF, the conditions required to meet the ASTM C-473 standard at this board density were determined. As shown in FIG. 2, boards made using starch in an amount of 4% and below by weight of the stucco, were unable, or only marginally able to meet the required nail pull standard.

It will be understood that while the invention has been described in conjunction with specific embodiments thereof, the foregoing description and examples are intended to illustrate, but not limit the scope of the invention. Unless otherwise specifically indicated, all percentages are by weight. Throughout the specification and in the claims the term "about" is intended to encompass + or −5%.

Other aspects, advantages and modifications will be apparent to those skilled in the art to which the invention pertains, and these aspects and modifications are within the scope of the invention, which is limited only by the appended claims.

What is claimed is:

1. A gypsum slurry suitable for producing a lightweight gypsum board comprising an aqueous mixture of calcined gypsum, a pre-gelatinized starch in an amount of more than 4% by weight of the calcined gypsum, and a lignosulfonate dispersant in an amount of at least 0.3% by weight of the calcined gypsum, wherein no naphthalenesulfonate is present in the gypsum slurry.

2. The gypsum slurry of claim 1 having a sufficient amount of a foam to cause the slurry to harden to a density of no more than 31 pounds per cubic foot.

3. The gypsum slurry of claim 2 wherein the foam comprises an ammonium ether sulfate surfactant.

4. The gypsum slurry of claim 1 having a water to calcined gypsum (water:calcined gypsum) weight ratio in the range of 0.7:1 to 1.3:1.

5. The gypsum slurry of claim 1 wherein the pre-gelatinized starch is in an amount of from 4.5% to 10% by weight of the calcined gypsum.

6. The gypsum slurry of claim 1 wherein the lignosulfonate dispersant is in an amount of from 0.35% to 1.0% by weight of the calcined gypsum.

7. The gypsum slurry of claim 1 wherein no sodium trimetaphosphate is present.

8. A lightweight gypsum wallboard comprising a set gypsum core containing a pre-gelatinized starch and a lignosulfonate dispersant, wherein the set gypsum core, formed by hydration of calcined gypsum supplied in a gypsum slurry, is sandwiched between two facing sheets of a fibrous material and wherein the pre-gelatinized starch is present in an amount of more than 4% by weight of the calcined gypsum, and the lignosulfonate dispersant is present in an amount of at least 0.3% by weight of the calcined gypsum wherein no naphthalenesulfonate is present in the gypsum slurry.

9. The lightweight gypsum wallboard of claim 8 having a sufficient amount of a foam in the gypsum slurry to cause the slurry to harden to a density of no more than 31 pounds per cubic foot.

10. The lightweight gypsum wallboard of claim 9 wherein the foam comprises an ammonium ether sulfate surfactant.

11. The lightweight gypsum wallboard of claim 8 having a water to calcined gypsum (water:calcined gypsum) weight ratio in the range of 0.7:1 to 1.3:1.

12. The lightweight gypsum wallboard of claim 8 wherein the pre-gelatinized starch is in an amount of from 4.5% to 10% by weight of the calcined gypsum.

13. The lightweight gypsum wallboard of claim 8 wherein the lignosulfonate dispersant is in an amount of from 0.35% to 1.0% by weight of the calcined gypsum.

14. The lightweight gypsum wallboard of claim 8 wherein no sodium trimetaphosphate is present.

15. The lightweight gypsum wallboard of claim 8 having a nominal thickness of ½ inch and a weight of from 1000 to 1300 pounds per MSF of board, wherein the two facing sheets are paper and the pre-gelatinized starch is a hydroxyalkylated corn starch.

* * * * *